(12) United States Patent
Edwards et al.

(10) Patent No.: US 12,202,219 B2
(45) Date of Patent: Jan. 21, 2025

(54) SYSTEM FOR MANUFACTURING A SUPPORT STRUCTURE

(71) Applicant: The Goodyear Tire & Rubber Company, Akron, OH (US)

(72) Inventors: Steven Amos Edwards, Akron, OH (US); Michael Scott Deem, Kent, OH (US); Ceyhan Celik, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 96 days.

(21) Appl. No.: 17/411,134

(22) Filed: Aug. 25, 2021

(65) Prior Publication Data
US 2023/0060519 A1 Mar. 2, 2023

(51) Int. Cl.
| | | |
|---|---|---|
| *B29D 30/02* | (2006.01) | |
| *B29D 30/06* | (2006.01) | |
| *B60C 7/10* | (2006.01) | |

(52) U.S. Cl.
CPC ........ *B29D 30/02* (2013.01); *B29D 2030/067* (2013.01); *B29D 2030/0674* (2013.01); *B60C 7/107* (2021.08)

(58) Field of Classification Search
CPC .............................. B29D 30/02; B60C 7/107
See application file for complete search history.

(56) References Cited

U.S. PATENT DOCUMENTS

| | | |
|---|---|---|
| 479,255 A | 7/1892 | Dunlop |
| 482,175 A | 9/1892 | Hollafolla |
| 1,002,003 A | 8/1911 | Simonson et al. |
| 1,233,722 A | 7/1917 | Smith |
| 1,389,285 A | 8/1921 | Althoff |
| 1,451,517 A | 4/1923 | Smith |
| 1,930,764 A | 10/1933 | Mallory |
| 3,493,027 A | 2/1970 | Dewhirst et al. |
| 4,226,273 A | 10/1980 | Long et al. |
| 4,235,270 A | 11/1980 | Kahaner et al. |
| 4,602,823 A | 7/1986 | Berg |
| 5,343,916 A | 9/1994 | Duddey et al. |
| 5,800,643 A | 9/1998 | Frankowski |
| 6,260,598 B1 | 7/2001 | Tanaka |
| 8,962,120 B2 | 2/2015 | Delfino et al. |
| 10,406,852 B2 | 9/2019 | Celik et al. |

(Continued)

FOREIGN PATENT DOCUMENTS

WO WO-2022266663 A1 * 12/2022

*Primary Examiner* — John J DeRusso
(74) *Attorney, Agent, or Firm* — June E. Rickey; Robert N. Lipcsik

(57) ABSTRACT

A system cures and manufactures a partially-cured tire assembly. The system includes a plurality of elongate spacer members for maintaining corresponding a uniform cavity tension in the partially-cured tire assembly, each spacer member including a first longitudinal body member axially opposed to a second longitudinal body member, two cam bolts for adjusting a radial gap between the first longitudinal body member and the second longitudinal body member, and two springs each attached to the first body member and the second body member for maintaining a radial compressive force against the cam bolts; a first annular curing platen for securing spacer members relative to each other; and a second annular curing platen for securing spacer members relative to each other.

9 Claims, 20 Drawing Sheets

(56) References Cited

U.S. PATENT DOCUMENTS

| | | |
|---|---|---|
| 10,457,094 B2 | 10/2019 | Celik et al. |
| 10,603,956 B2 | 3/2020 | Celik et al. |
| 2004/0069385 A1 | 4/2004 | Timoney et al. |
| 2010/0193097 A1 | 8/2010 | McNier et al. |
| 2012/0205017 A1 | 8/2012 | Endicott |
| 2019/0152256 A1 | 5/2019 | Hwang et al. |

* cited by examiner

SYSTEM FOR MANUFACTURING A SUPPORT STRUCTURE

FIELD OF INVENTION

The present invention relates to wheel/tire assemblies, and more particularly, to a system for manufacturing non-pneumatic wheel/tire assemblies.

BACKGROUND OF THE INVENTION

Radial pneumatic tires rely on the ply reinforcement to carry and transfer the load between the rim and the belt layer. These ply cords need to be tensioned to carry the load. Tensioning of these ply cords is achieved with the pressurized air in the inner chamber of the tire. If air pressure is lost, load carrying capacity of a pneumatic tire decreases significantly. Preventing the slow or sudden air pressure loss has been a challenge for the tire makers. One proposed solution is to use non-pneumatic tires. A top loader non-pneumatic tire can perform similar to a pneumatic tire if its durability, speed rating/limit and load capacity can be increased to the levels of a pneumatic tire.

Many top loader non-pneumatic tires rely on the polymeric spokes to carry the load of the vehicle. Spokes transfer the load from the rim to the shear band. Due to the characteristics of the polymeric materials used in the spokes of these tires, performance of these tires is limited. It is an object of the present invention to overcome this limitation and increase the load carrying capacity and durability of these spokes and hence the performance of the top loader non-pneumatic tire.

Definitions

As used herein and in the claims:

"Annular" means formed like a ring.

"Axial" and "axially" refer to lines or directions that are parallel to the axis of rotation of the tire.

"Circumferential" and "circumferentially" mean lines or directions extending along the perimeter of the surface of the annular tire parallel to the equatorial plane (EP) and perpendicular to the axial direction; it can also refer to the direction of the sets of adjacent circular curves whose radii define the axial curvature of the tread, as viewed in cross section.

"Equatorial plane (EP)" means the plane perpendicular to the tire's axis of rotation and passing through the center of its tread; or the plane containing the circumferential centerline of the tread.

"Inner" means toward the inside of the tire and "outer" means toward its exterior.

"Lateral" means an axial direction.

"Normal load" means the load assigned by the appropriate standards organization for the service condition for the tire.

"Radial" and "radially" mean directions radially toward or away from the axis of rotation of the tire.

"Spring rate" means the stiffness of tire expressed as the slope of the load deflection curve at a given pressure.

"Tread" means a molded rubber component which, when bonded to a tire casing, includes that portion of the tire that comes into contact with the road when the tire is normally inflated and under normal load.

"Tread element" or "traction element" means a rib or a block element.

"Tread width" means the arc length of the tread surface in a plane including the axis of rotation of the tire.

"Vertical deflection" means the amount that a tire deflects under load.

"Wheel" or "hub" means a structure for supporting the tire and mounting to the vehicle axle.

SUMMARY OF THE INVENTION

A system in accordance with the present invention cures and manufactures a partially-cured tire assembly. The system includes a plurality of elongate spacer members for maintaining corresponding a uniform cavity tension in the partially-cured tire assembly, each spacer member including a first longitudinal body member axially opposed to a second longitudinal body member, two cam bolts for adjusting a radial gap between the first longitudinal body member and the second longitudinal body member, and two springs each attached to the first body member and the second body member for maintaining a radial compressive force against the cam bolts; a first annular curing platen for securing spacer members relative to each other; and a second annular curing platen for securing spacer members relative to each other.

According to another aspect of the system, each cam bolt is mounted within a circumferentially extending groove on a radially inner surface of the second longitudinal body member.

According to still another aspect of the system, the grooves and the cam bolts allow a discreet two-position adjustment of the spacer members.

According to yet another aspect of the system, the spacer members and first and second curing platens are heated in order to cure flap members of the partially-cured tire assembly.

According to still another aspect of the system, each cam bolt of a spacer member is rotatingly aligned having a first width of each cam bolt positioned wider than a groove on the second longitudinal body member such that the spacer member and springs expand to a first greater radial height position in order to tension flap members of the partially-cured tire assembly.

According to yet another aspect of the system, each cam bolt is rotatingly aligned having a second width of each cam bolt positioned narrower than each groove such that the spacer member and springs contract to a second lesser radial position.

According to still another aspect of the system, the spacer members are expanded to the first radial position during curing to ensure the proper overlap for flap members of the partially-cured tire assembly and uniform dimensions for cavities formed by cured flap members.

According to yet another aspect of the system, after curing, the spacer members are adjusted to the second radial position for facilitating removal of the spacer members from cavities formed by the fully-cured flap members.

According to still another aspect of the system, the spacer members are heated by steam.

According to yet another aspect of the system, the first and second longitudinal body members are heated by electricity.

A method in accordance with the present invention completes the curing of a partially cured tire assembly. The method includes the steps of: maintaining a plurality of elongate spacer members at a uniform cavity tension in the partially-cured tire assembly; radially opposing a first longitudinal body member to a second longitudinal body member; adjusting a radial gap between the first longitudinal body member and the second longitudinal body member by two cam bolts; and attaching two springs to both the first body member and the second body member for maintaining a radial compressive force against the cam bolts.

According to another aspect of the method, a further step includes mounting each cam bolt within a circumferentially extending groove on an inner surface of the second longitudinal body member.

According to still another aspect of the method, the grooves and the cam bolts allow a discreet two-position adjustment of the spacer members.

According to yet another aspect of the method, a further step includes heating the spacer members in order to cure flap members of the partially-cured tire assembly.

According to still another aspect of the method, a further step includes aligning each cam bolt of a spacer member with a first width of each cam bolt positioned wider than a groove on the second longitudinal body member.

According to yet another aspect of the method, a further step includes expanding the spacer members and springs to a first greater radial height position in order to tension flap members of the partially-cured tire assembly.

According to still another aspect of the method, a further step includes aligning each cam bolt to a second width of each cam bolt narrower than each groove such that the spacer members and springs contract to a second lesser radial position.

According to yet another aspect of the method, a further step includes expanding the spacer members to the first radial position during curing to ensure the proper overlap for flap members of the partially-cured tire assembly and uniform dimensions for cavities formed by cured flap members.

According to still another aspect of the method, a further step includes adjusting the spacer members to the second radial position for facilitating removal of the spacer members from cavities formed by the fully-cured flap members.

According to yet another aspect of the method, a further step includes electrically heating the first and second longitudinal body members.

BRIEF DESCRIPTION OF THE DRAWINGS

The present invention will be more clearly understood by the following description of some examples thereof, with reference to the accompanying drawings, in which.

DESCRIPTION OF EXAMPLES OF THE PRESENT INVENTION

A conventional wheel/tire assembly may have an outer ring, such as a shear band, flexibly connected to a central hub by means of lightweight composite springs. The springs may be plates fixed to the ring and to the hub. The hub may contain a speed reduction gear unit and/or an electric motor and may have a suspension mechanism for connecting a vehicle chassis to each wheel. The ring may be constructed from a flexible composite material, such as carbon fiber reinforced nylon material and have twin rubber tires and a plurality of circumferentially spaced-apart radial cleats which engage the ground and provide improved traction. The hub may also be formed from a carbon fiber reinforced composite material. Another conventional wheel may have a rubber strip with a molded tread bonded to a composite ring for improved grip. Further, the springs interconnecting the ring and hub may be S-shaped lightweight composite springs.

Another conventional wheel/tire assembly may be formed from a lightweight composite material, such as carbon fiber reinforced polyamide. The assembly may have a cylindrical central hub and a circular outer flexible rim mounted on the central hub by an endless looped spring band extending between the central hub and the circular rim. Six radial loops may be defined by the spring band. The spring band may be attached to the central hub and to the circular rim by any suitable means, such as adhesion, cohesion, soldering and/or mechanical fixing by means of bolts, rivets, and/or clamps.

Figure 20:
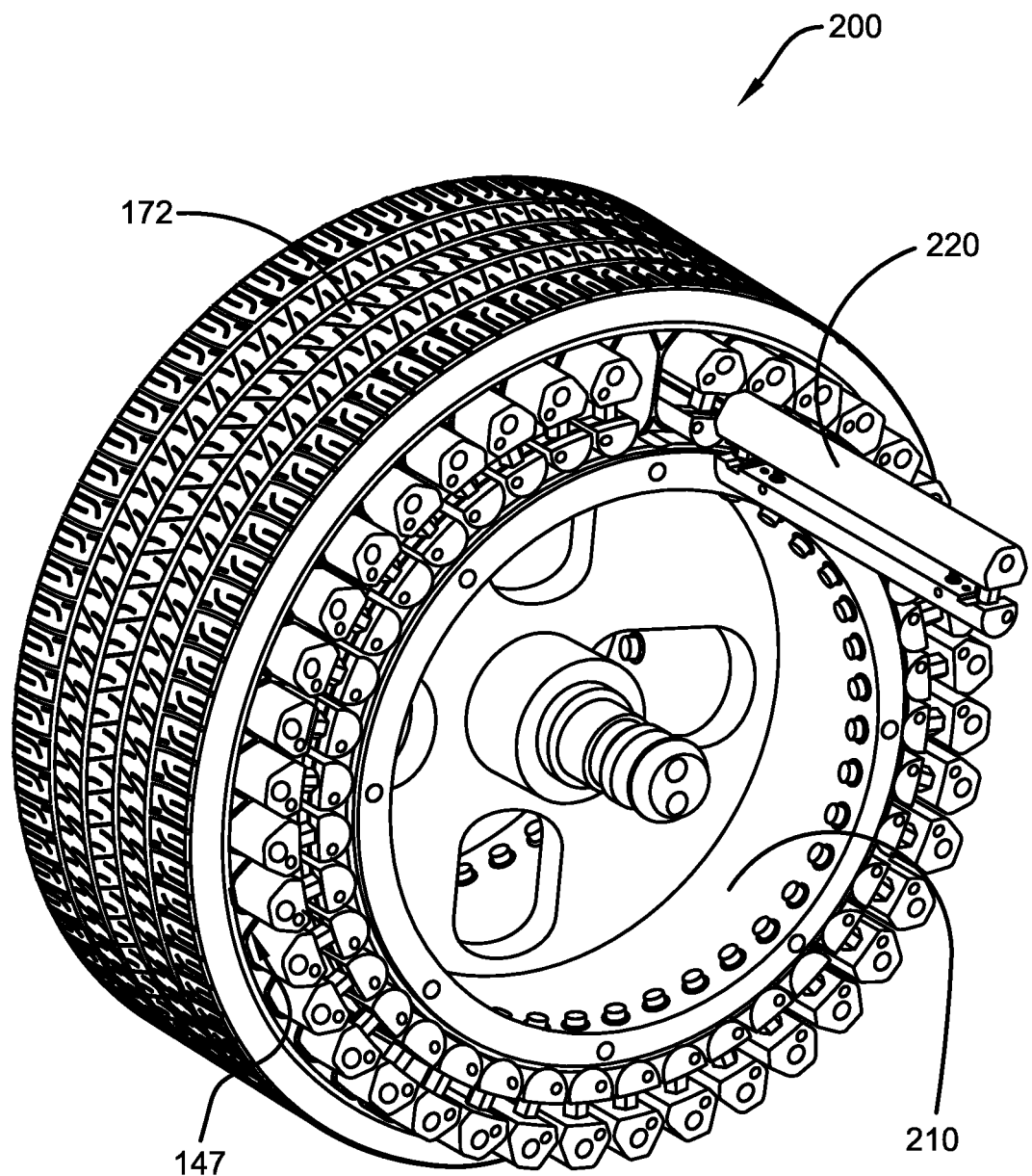
FIG. 20 is a schematic perspective view of yet another part of the assembly of FIG. 3.
Figure 21:
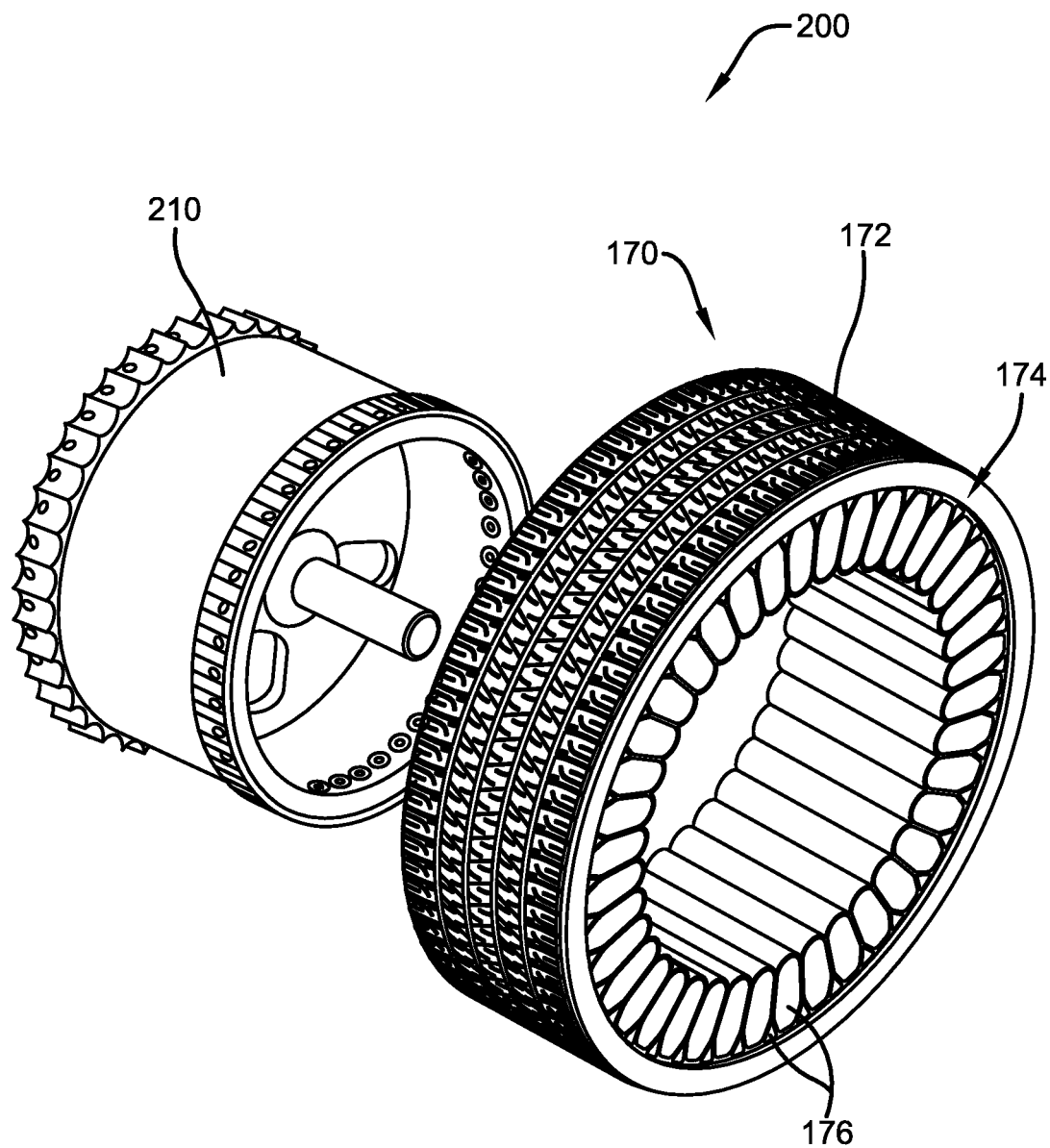
FIG. 21 is a schematic perspective view of still another part of the assembly of FIG. 3.

As shown in FIGS. 20-21, an example tire assembly, such as that described in Applicant's U.S. Pat. No. 10,207,544, incorporated herein by reference in its entirety, may be formed from a lightweight polymer material, such as, for example, a standard tire rubber compound, a thermoplastic polymer, polyethylene terephthalate (PET), polyether ether ketone (PEEK), a cross-linking polymer like natural rubber, synthetic rubber-like polymers, epoxy resins, and/or phenolic resins. The assembly may have an inner central rim, such as an automobile wheel (not shown), and a circular outer flexible ring, which may include a shear band and tread structure, mounted on the inner central rim by a continuous cord/fabric reinforced spoke structure extending between the inner central rim and the outer ring.

The spoke structure may define a plurality of cavities disposed concentrically about the inner central rim allowing the spoke structure to deflect under load thereby defining a suitable balance between flexibility for ride comfort and traction within a footprint of the assembly and stiffness for vehicle handling, low rolling resistance, and low heat build-up within the spoke structure. The cavities of the spoke structure may further define openings for arms of the inner central rim to extend therethrough and secure the spoke structure to the inner central rim. The arms may engage portions in a mechanical interlocking arrangement. The inner central rim may further include plates that, along with the arms may sandwich the portions of the spoke structure and create a further frictional and/or adhesive securement between the inner central rim and the spoke structure. The spoke structure may comprise a homogenous or heterogeneous polymer and/or a filled polymer.

Spokes of the spoke structure may be curved inwardly or outwardly for mitigating or enhancing buckling of the spokes. The spokes may include one or more reinforcing layers. The layer(s) may be constructed of single end dipped cords, conventional pneumatic tire ply/cord arrangements, short fibers, and/or polymeric film. Further, these constructions may be PET, nylon 6, nylon 6,6, rayon, steel, glass fibers, carbon fiber, aramid, and/or a hybrid construction of these materials. The cords may be from 400 denier to 9000 denier. The polymeric film may be from 0.1 mm to 2.0 mm thick. The spokes may be oriented at angle between 0 degrees and 90 degrees. The reinforcement of the spokes may be continuously reinforced across their entire axial length. Continuous reinforcement layer(s) may extend radially outward to multiple locations adjacent to a shear band at the outer flexible ring.

Each cavity may have a common cross-sectional profile about the axis of rotation of the assembly. Further, each cavity may have a common axial length equal to a uniform axial thickness of the spoke structure. Each cavity may be curvedly shaped to prevent "pinch" points on the reinforcement layer(s) and mitigate compressive stress concentrations on the reinforcement layer(s). The number of cavities may be between 2 and 60 for large scale tire assemblies. The inner central rim may include steel, cast iron, aluminum, aluminum alloys, magnesium allows, and/or iron alloys.

FIGS. 3-21 show an example system 200 for use with the present invention curing and manufacturing partially-cured pneumatic and/or non-pneumatic tire assemblies 140. The system 200 may include an annular hub member 210 slid into a corresponding annular, radially inner surface 142 of the tire assembly 140, a plurality of spacer members 220 for maintaining corresponding uniform cavity dimensions in the tire assembly 140 by fastening the spacer members 220 to the hub member 210 with flap members 147 of the tire assembly 140 enclosing a radially outermost surface 222 of each of the spacer members 220, first and second curing platens 230, 240 for axially securing the hub member 210 and spacer members 220 relative to each other, and a plurality of triangular inserts 250 for creating a substantially smooth, uniform outer cylindrical surface formed by a radially outer surface 252 of each triangular insert 250 and each of the flap members 147 of the tire assembly 140 positioned by the radially outermost surfaces 222 of the spacer members 220. The curing platens 230, 240 may also have spring hook members 270 for maintaining alignment with the spacer members 220 and the remaining parts of the assembly 200.

Figure 15:
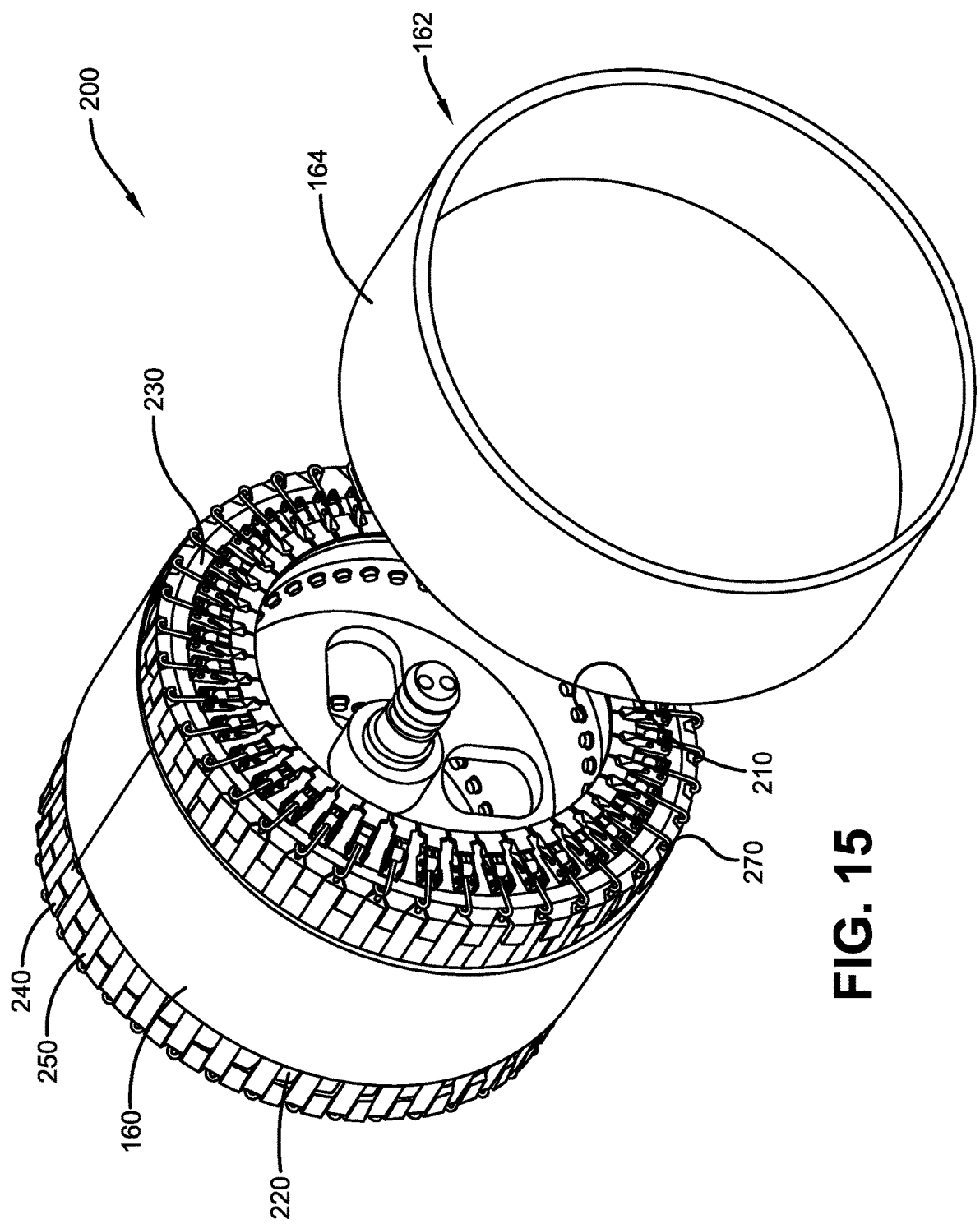
FIG. 15 is a schematic perspective view of still another part of the assembly of FIG. 3.
Figure 16:
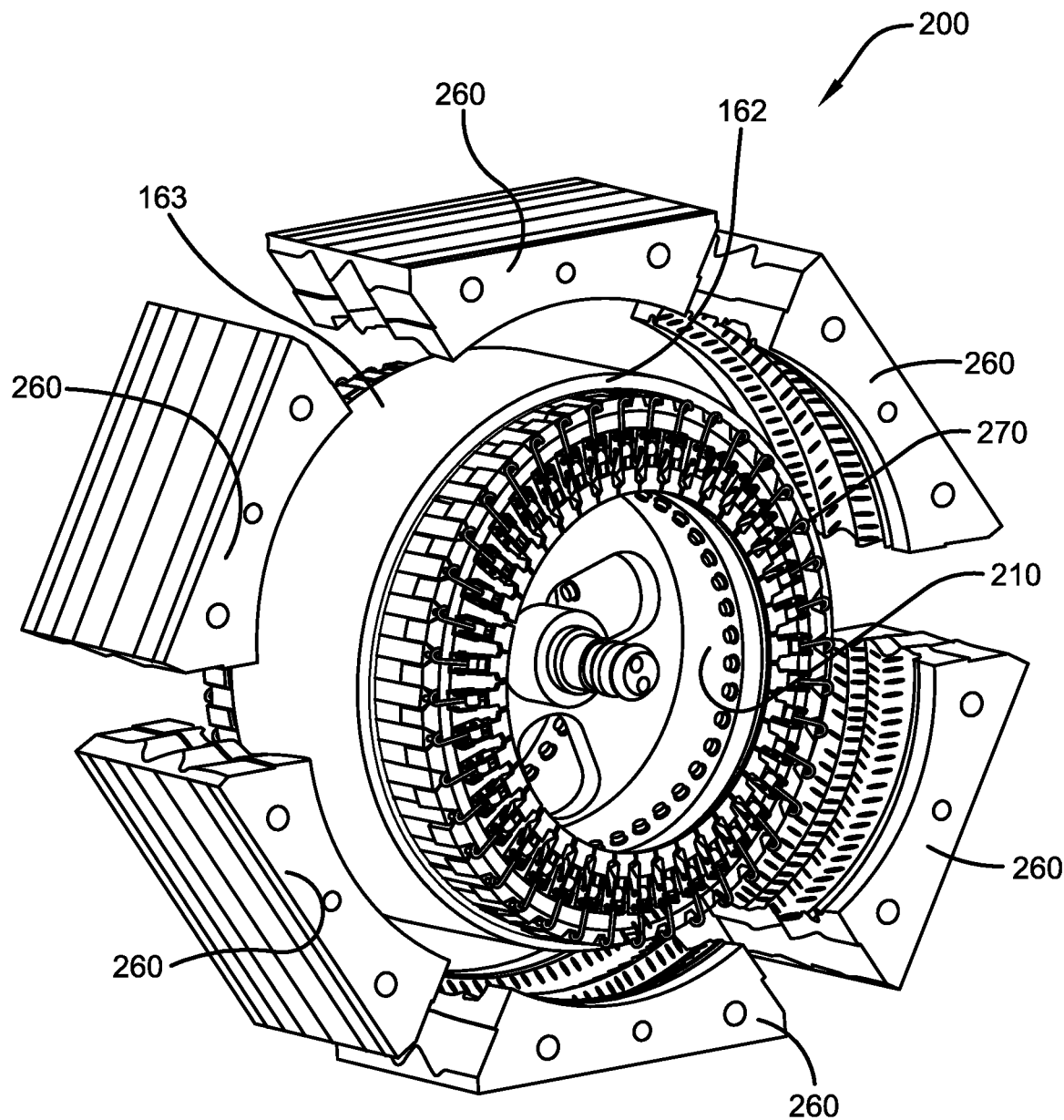
FIG. 16 is a schematic perspective view of yet another part of the assembly of FIG. 3.
Figure 17:
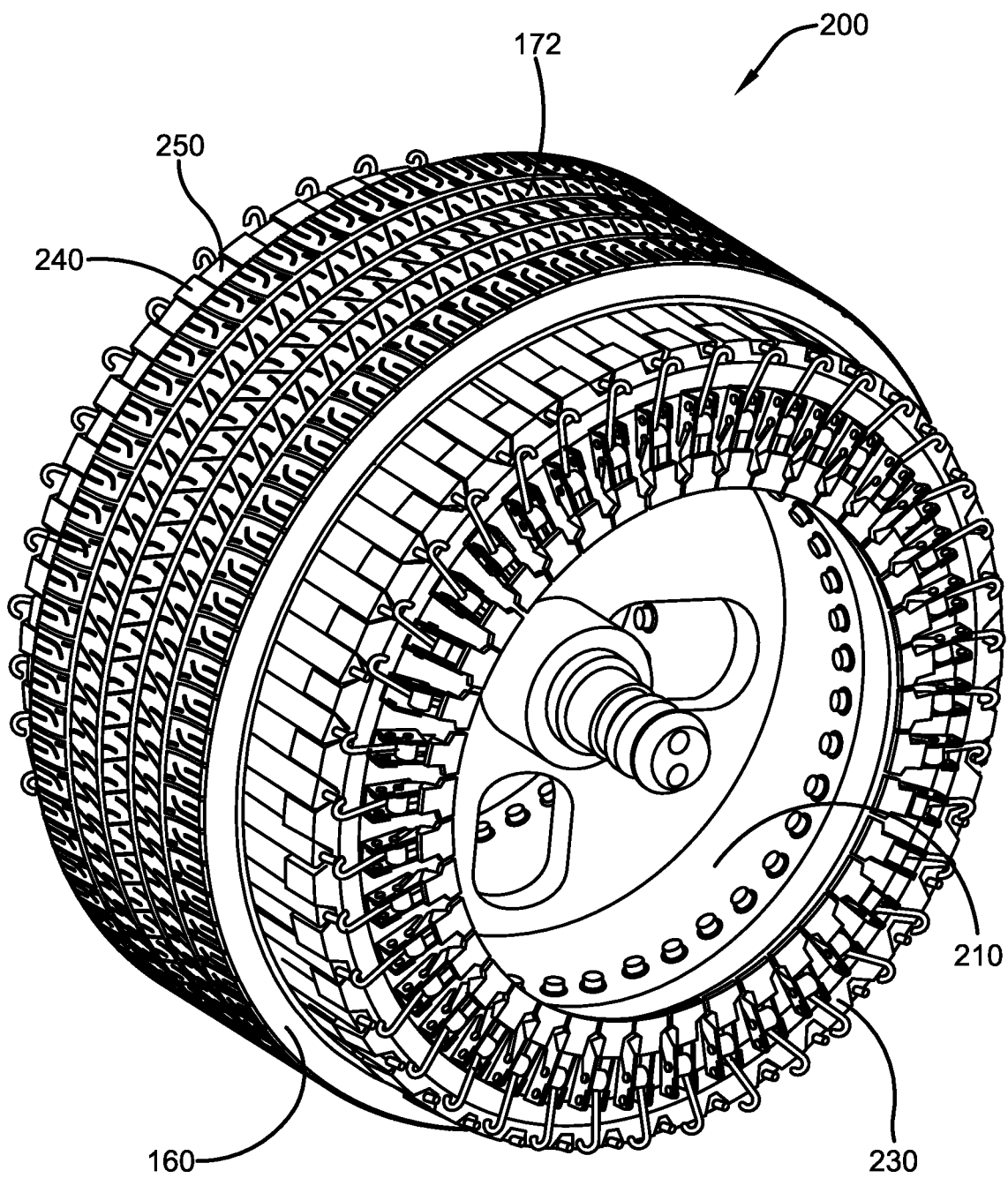
FIG. 17 is a schematic perspective view of still another part of the assembly of FIG. 3.
Figure 18:
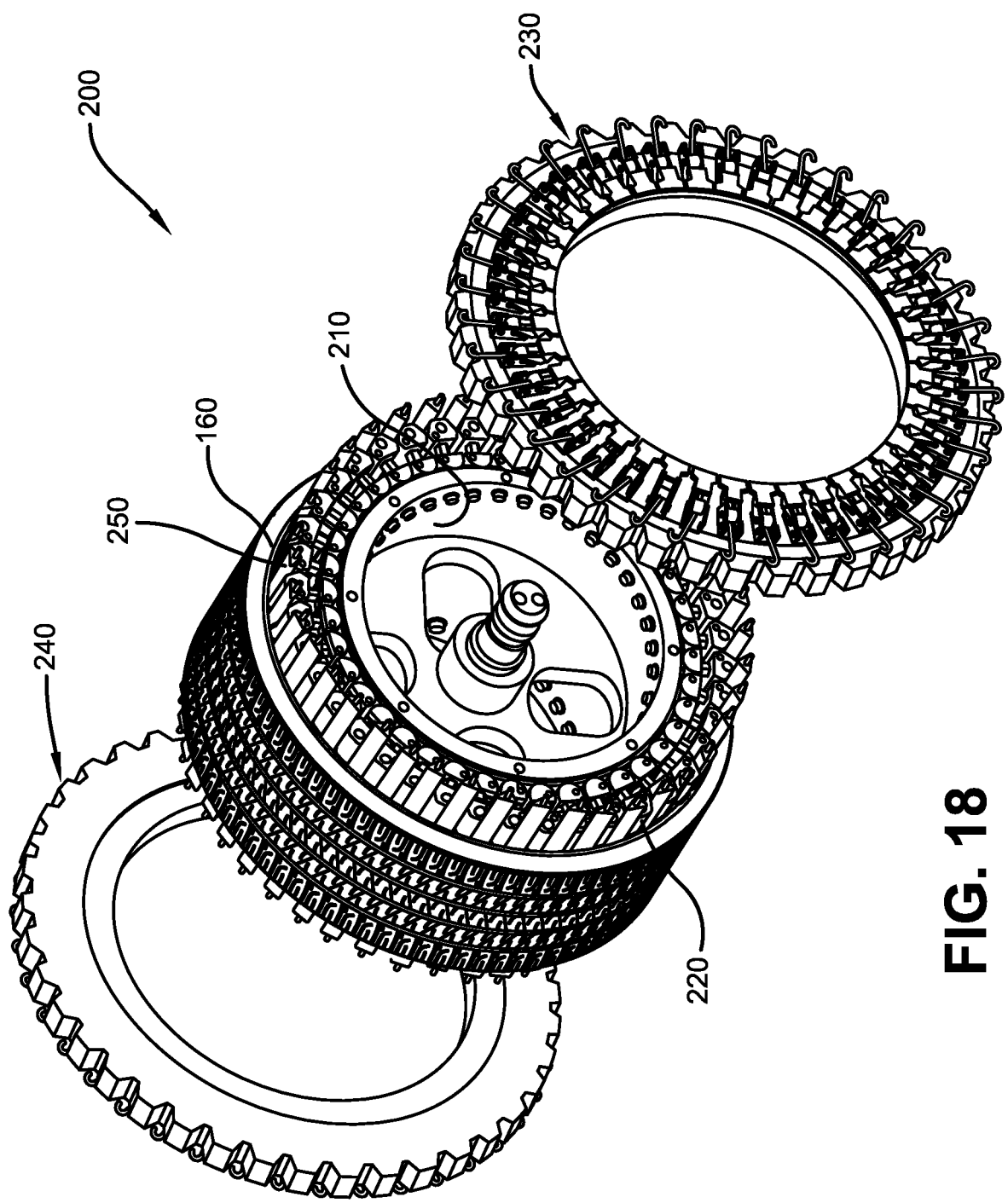
FIG. 18 is an exploded schematic perspective view of yet another part of the assembly of FIG. 3.
Figure 19:
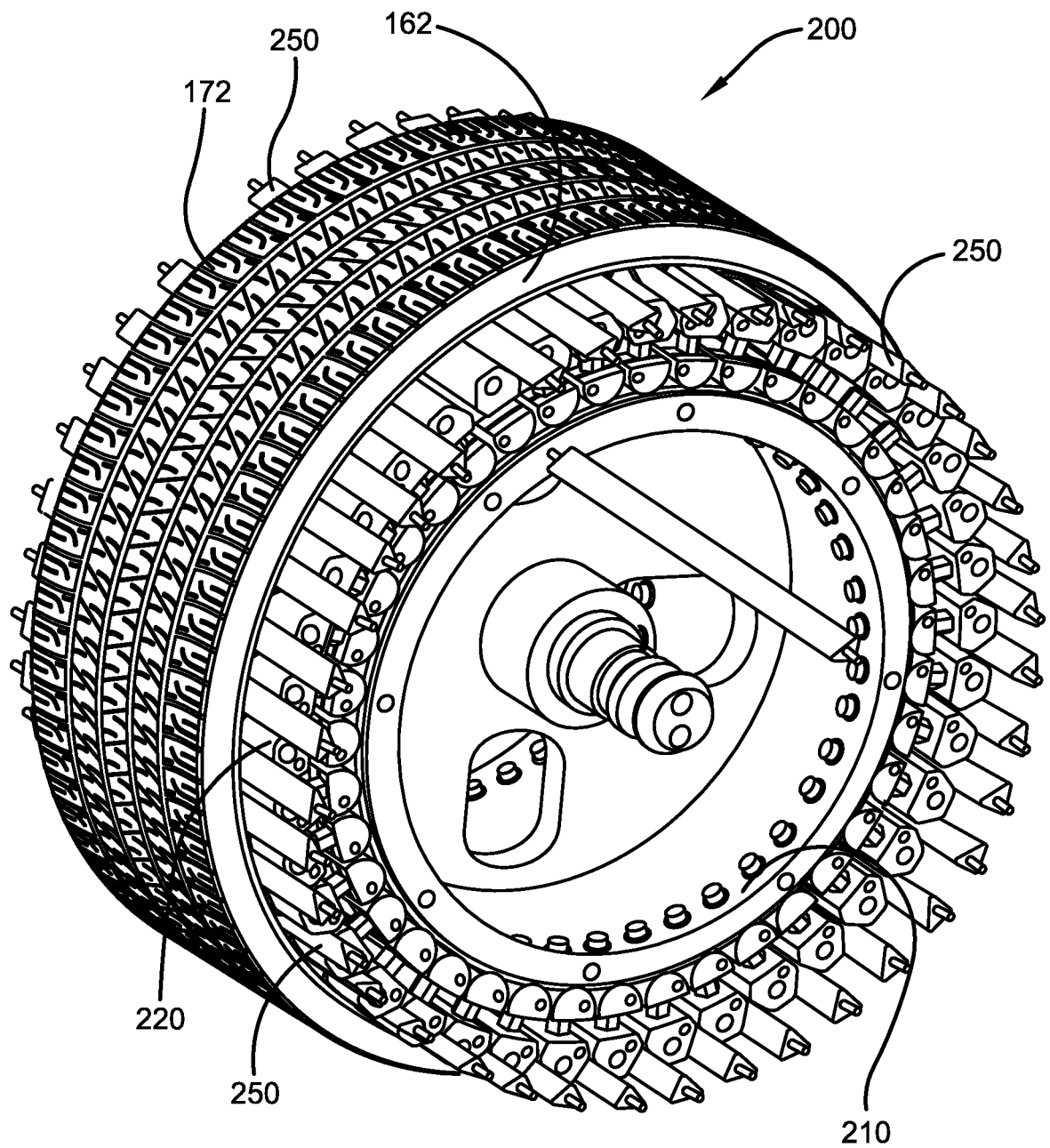
FIG. 19 is a schematic perspective view of still another part of the assembly of FIG. 3.

An inner annular shear band 160 and an outer annular tread member 162 of the tire assembly 140 may be serially placed circumferentially around the uniform outer cylindrical surface 147, 252 and affixed at least temporarily thereto and to each other 160, 162. This may be accomplished by building up layers 160, 162 around the assembly 200 similar to a conventional tire building method (not shown) or by forming a complete annular band structure from the shear band 160 and the tread member 162 (FIG. 15). A plurality of mold members 260 (six shown in FIG. 16) may be placed circumferentially around a radially outer surface 163 of the tread member 162. The mold members 260 may have radially inner surfaces 262 for together forming a tread shaped outer surface in the outer surface 163 of the tread member 162.

The spacer members 220, curing platens 230, 240, triangular inserts 250, and mold members 260 may be heated in order to cure form the flap members 147, shear band 160, and tread member 162 (e.g., uncured parts of the tire assembly 140) into a molded integral part of a complete, cured tire assembly 170 having an appropriate tread 172 (FIG. 21). Once curing is complete, the mold members 260 may be radially removed from around the complete tire assembly 170, the curing platens 230, 240 may axially removed from the hub member 210, and the spacer members 220 and inserts 250 may be axially withdrawn from the tire assembly 170 to reveal stable cavities 176 within a spoke structure 174 of the mount-ready tire assembly 170.

Figure 1:
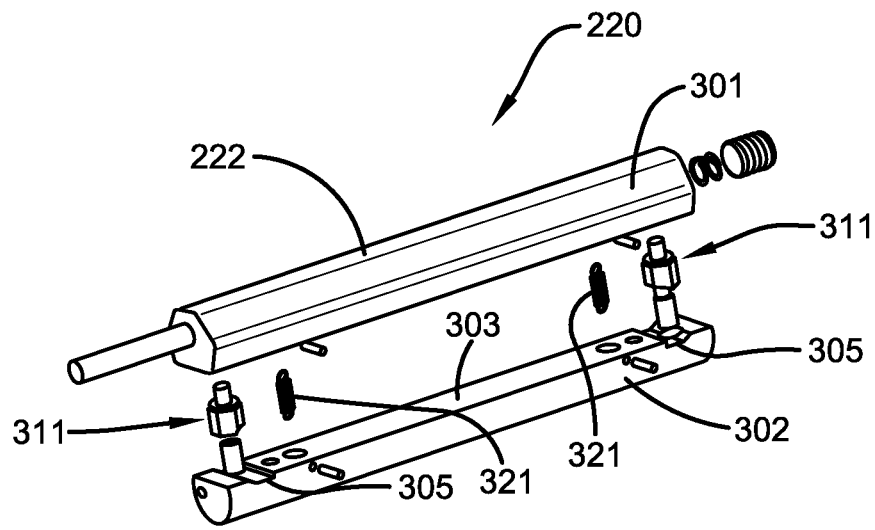
FIG. 1 is a schematic perspective view of a part of an example wheel/tire assembly in accordance with the present invention.
Figure 2:
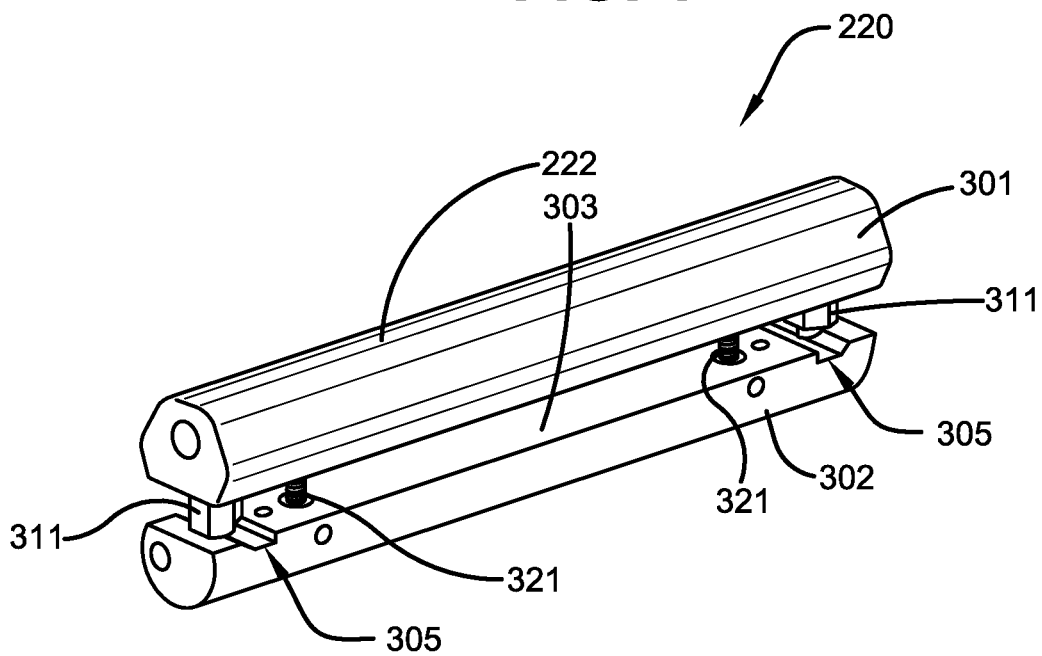
FIG. 2 is another schematic perspective view of part of the assembly of FIG. 1.
Figure 3:
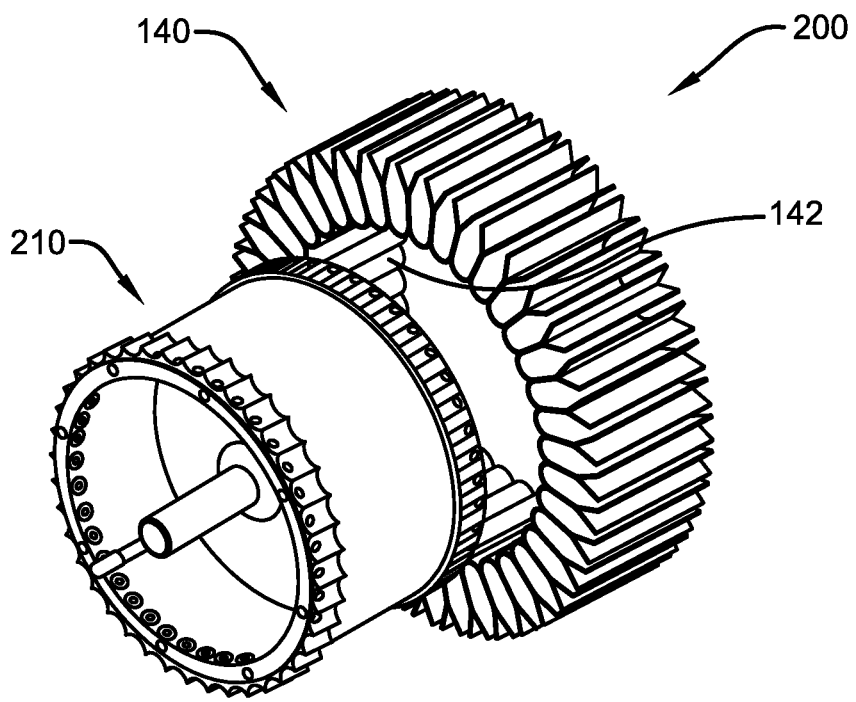
FIG. 3 is a schematic perspective view of a greater part of the assembly of FIG. 1.
Figure 4:
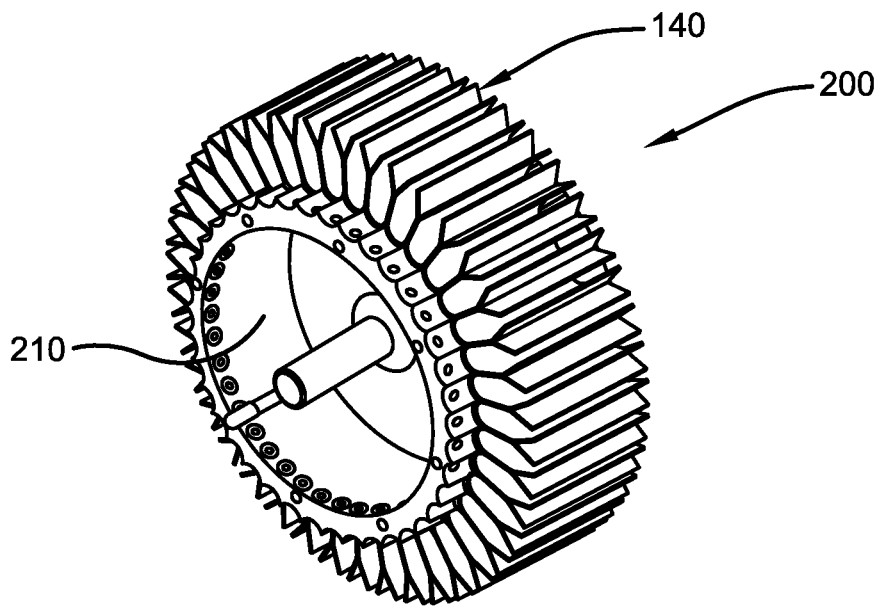
FIG. 4 is another schematic perspective view of the greater part of the assembly of FIG. 3.
Figure 5:
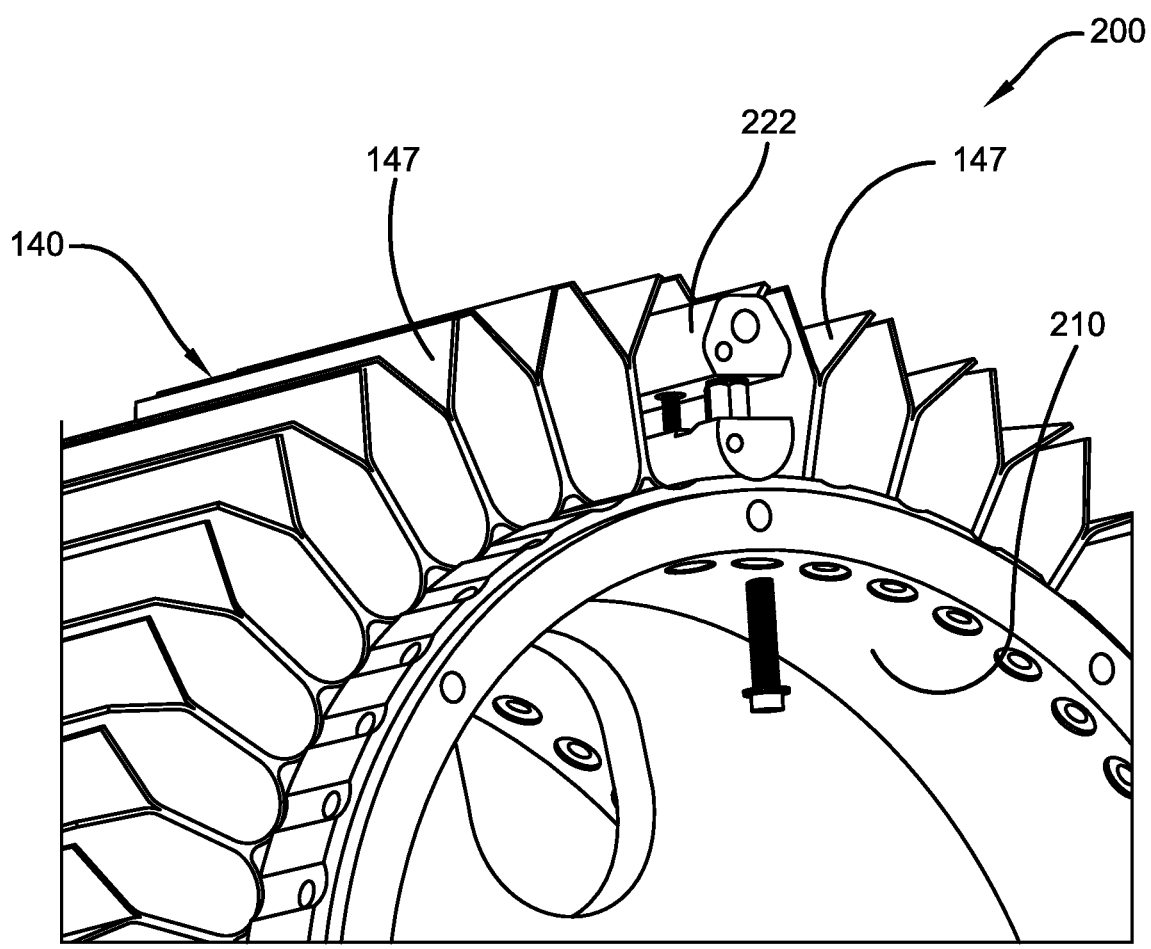
FIG. 5 is a schematic perspective view of still another part of the assembly of FIG. 3.
Figure 6:
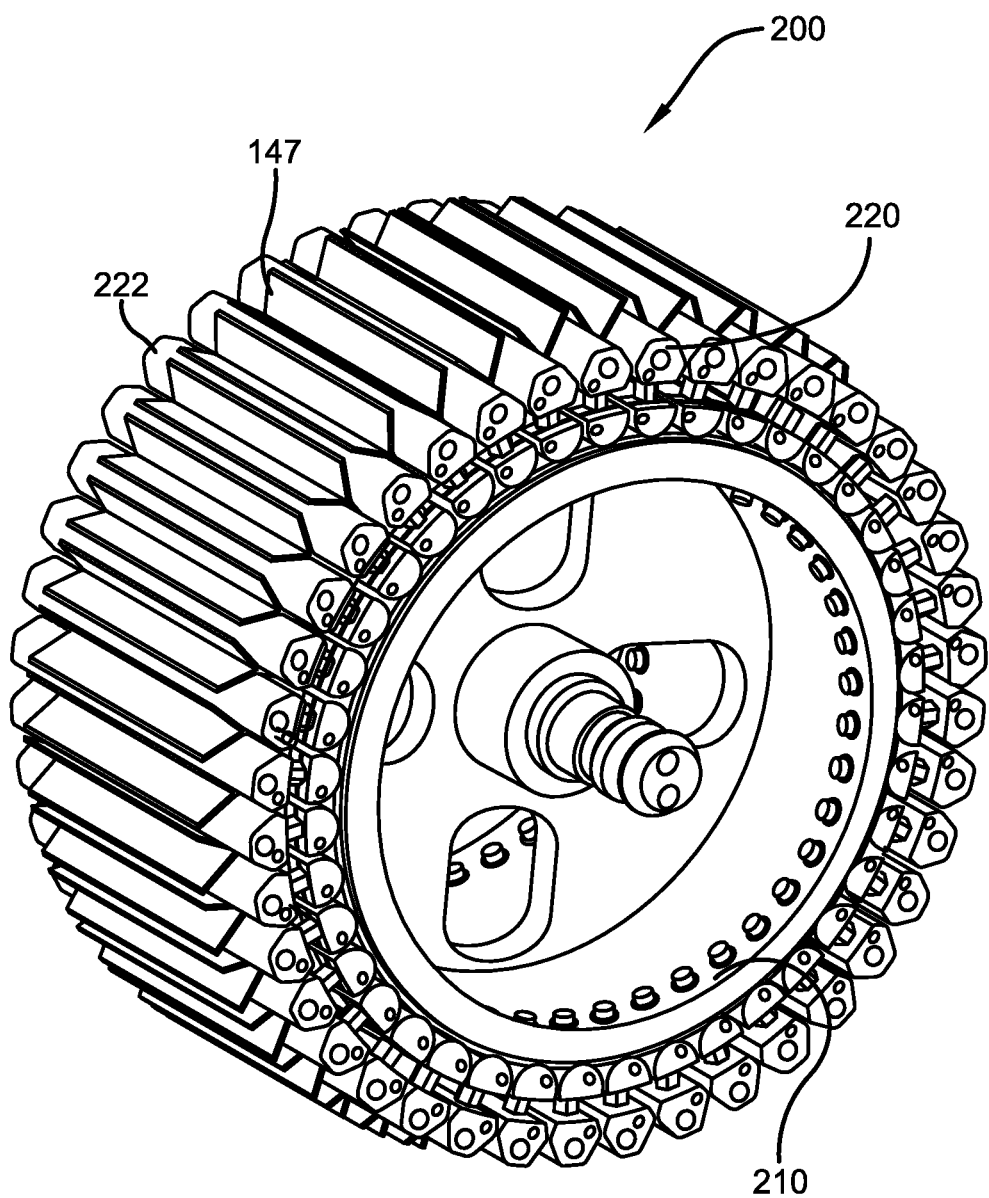
FIG. 6 is a schematic perspective view of yet another part of the assembly of FIG. 3.
Figure 7:
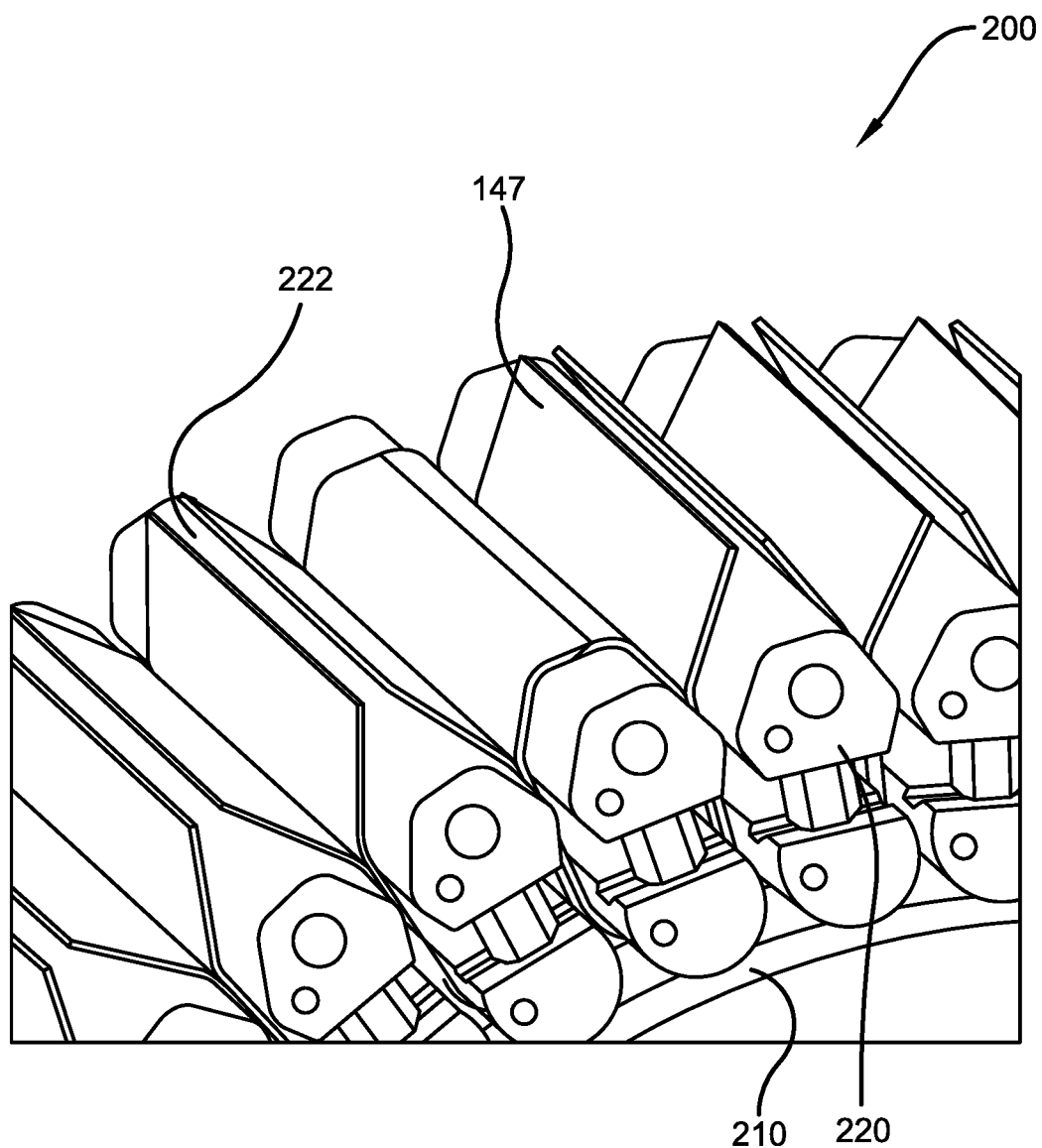
FIG. 7 is a schematic perspective view of still another part of the assembly of FIG. 3.
Figure 8:
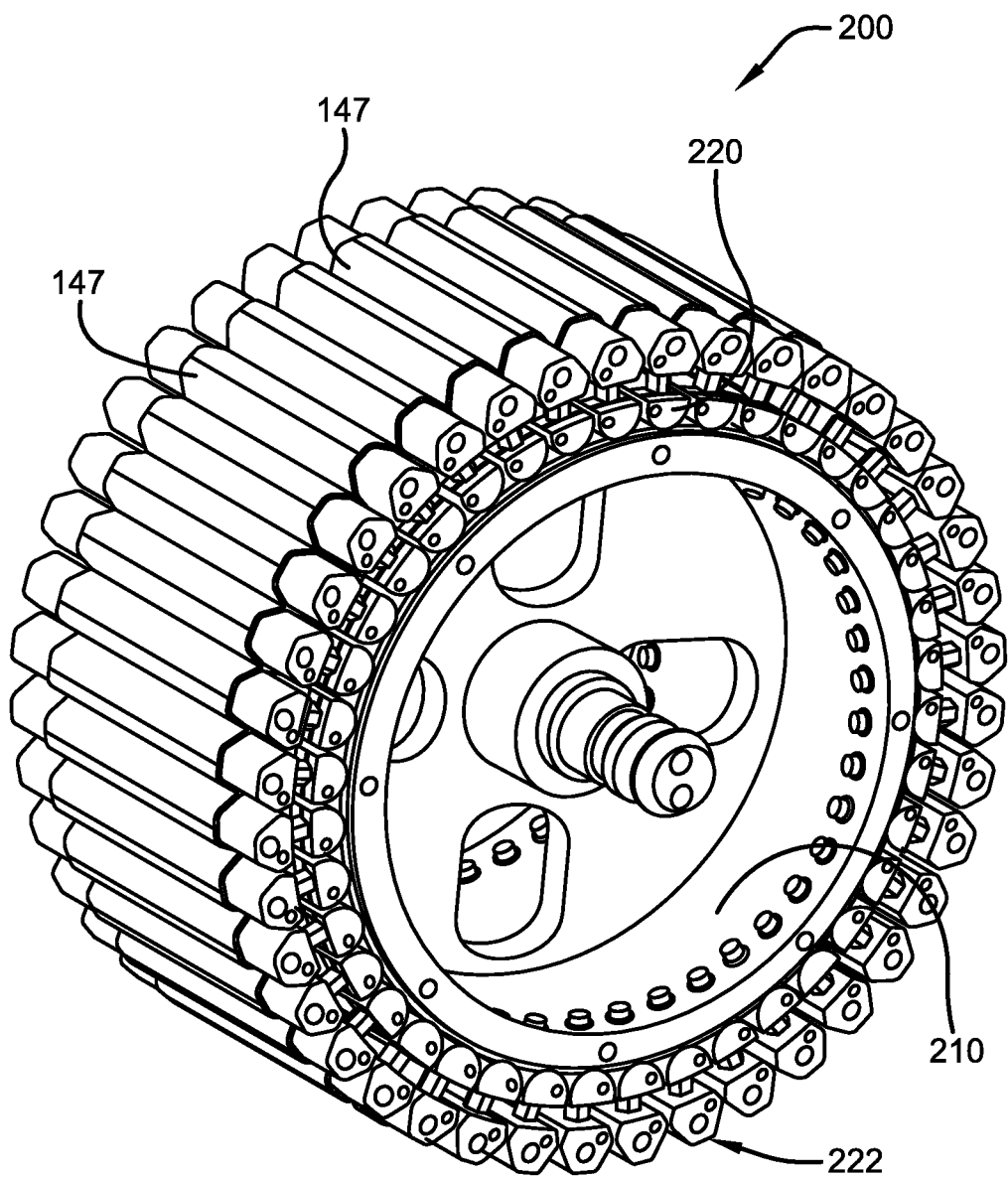
FIG. 8 is a schematic perspective view of yet another part of the assembly of FIG. 3.
Figure 9:
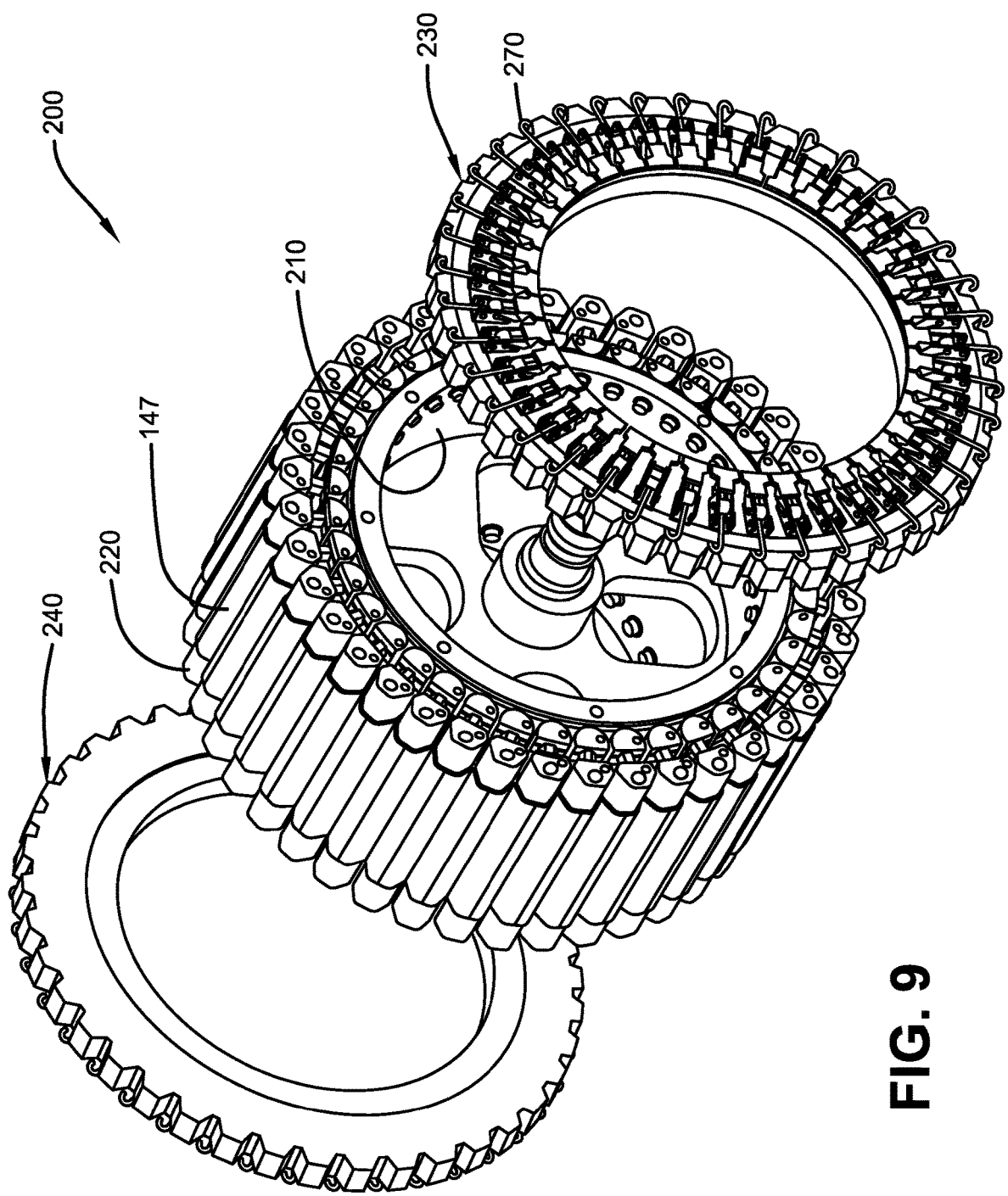
FIG. 9 is an exploded schematic perspective view of still another part of the assembly of FIG. 3.
Figure 10:
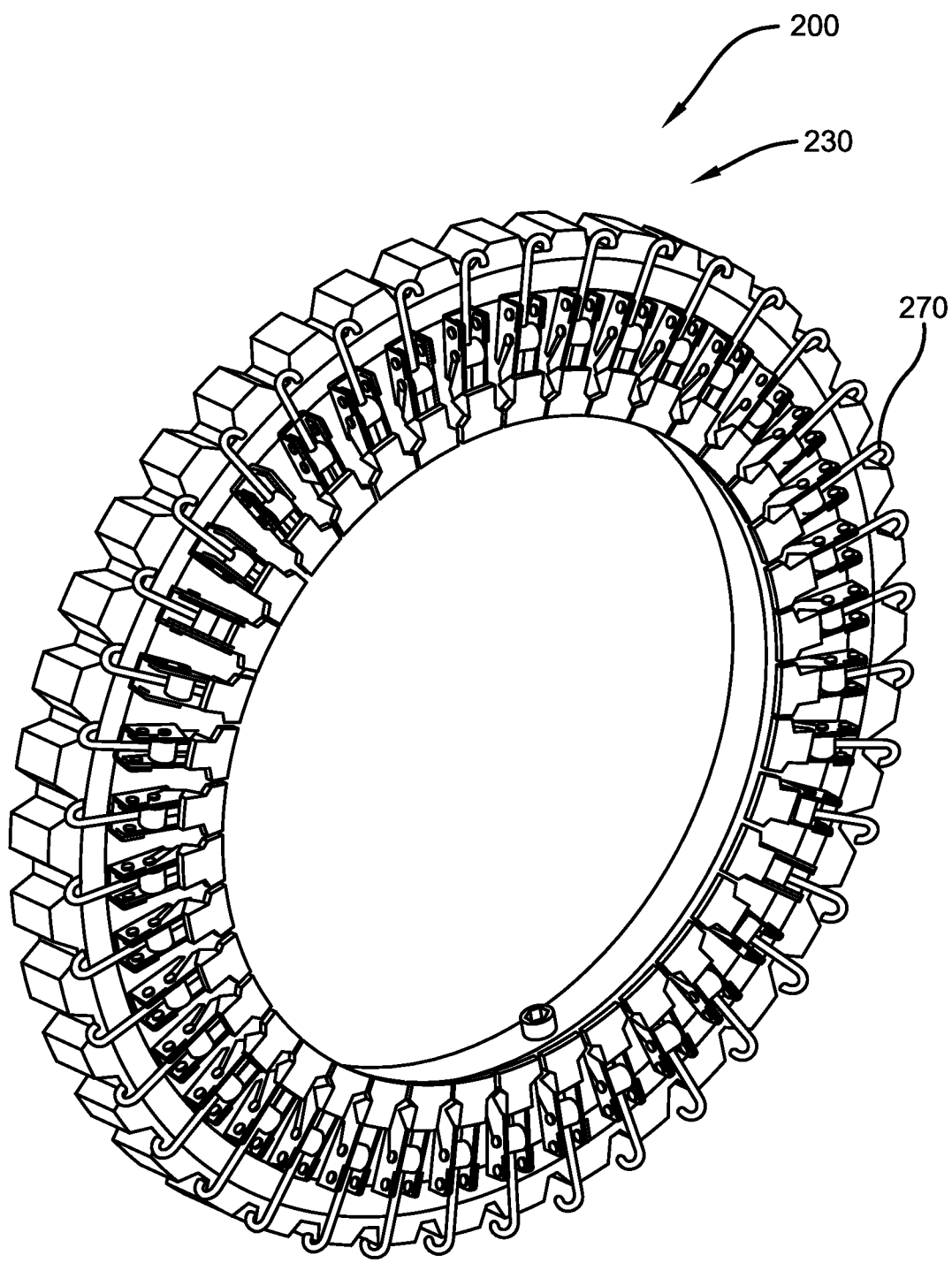
FIG. 10 is a schematic perspective view of yet another part of the assembly of FIG. 3.
Figure 11:
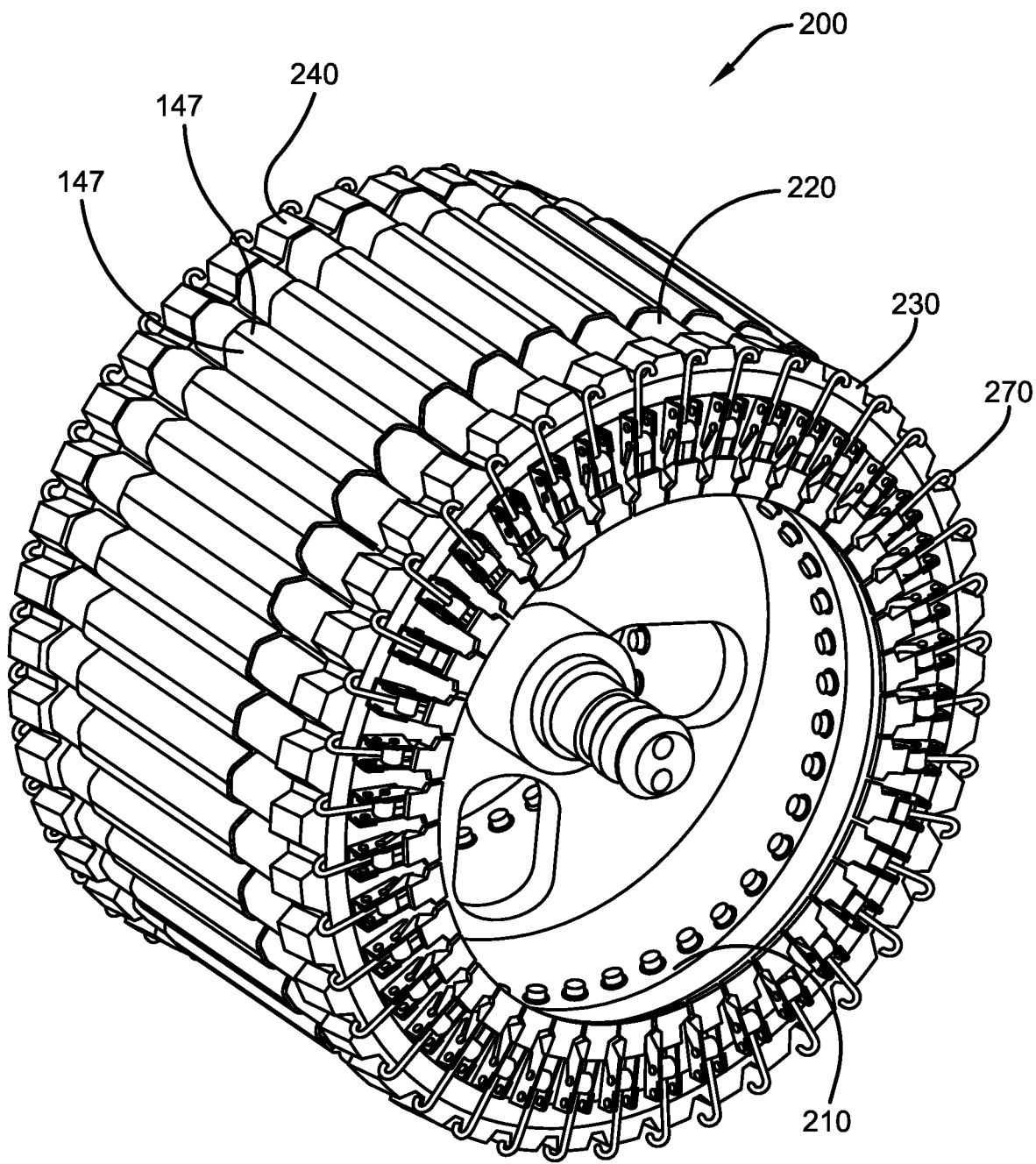
FIG. 11 is a schematic perspective view of still another part of the assembly of FIG. 3.
Figure 12:
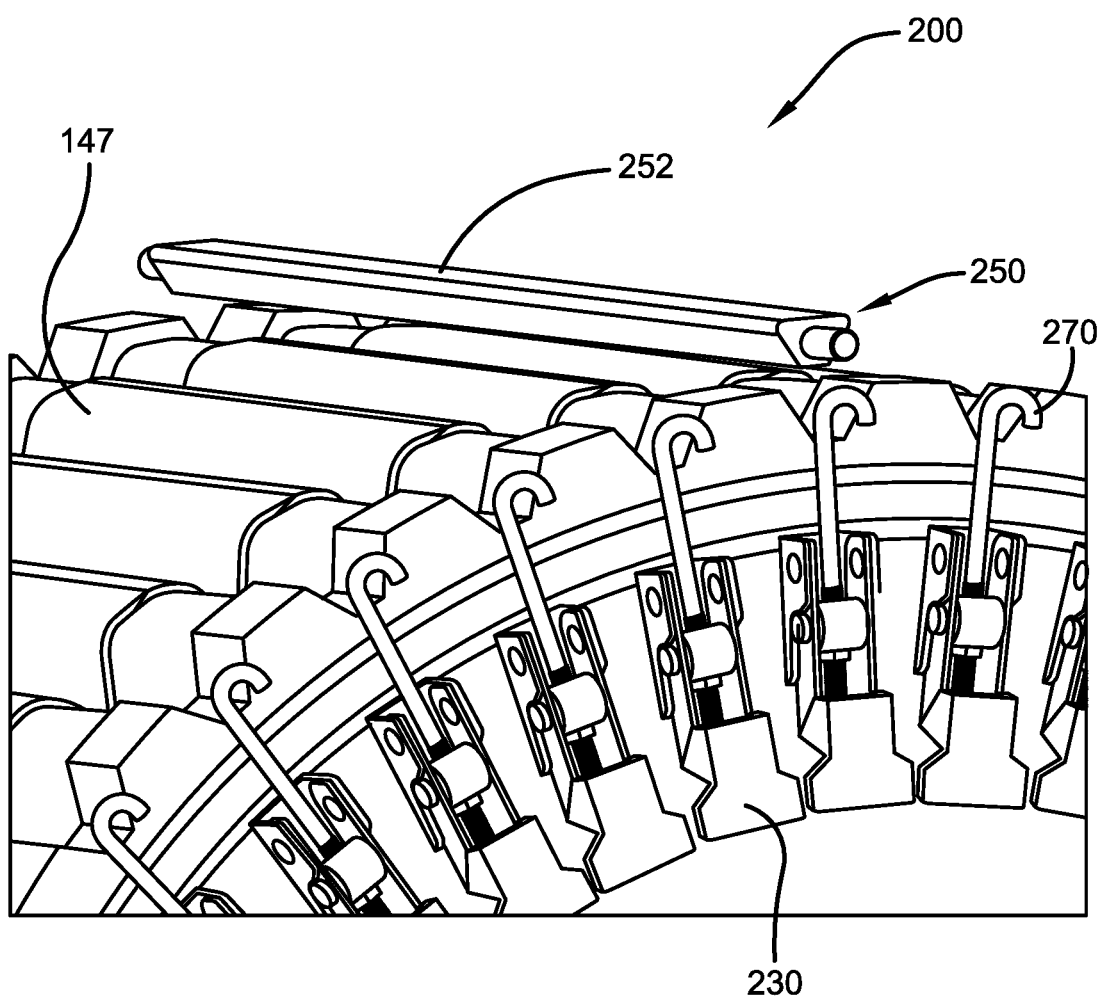
FIG. 12 is a schematic perspective view of yet another part of the assembly of FIG. 3.
Figure 13:
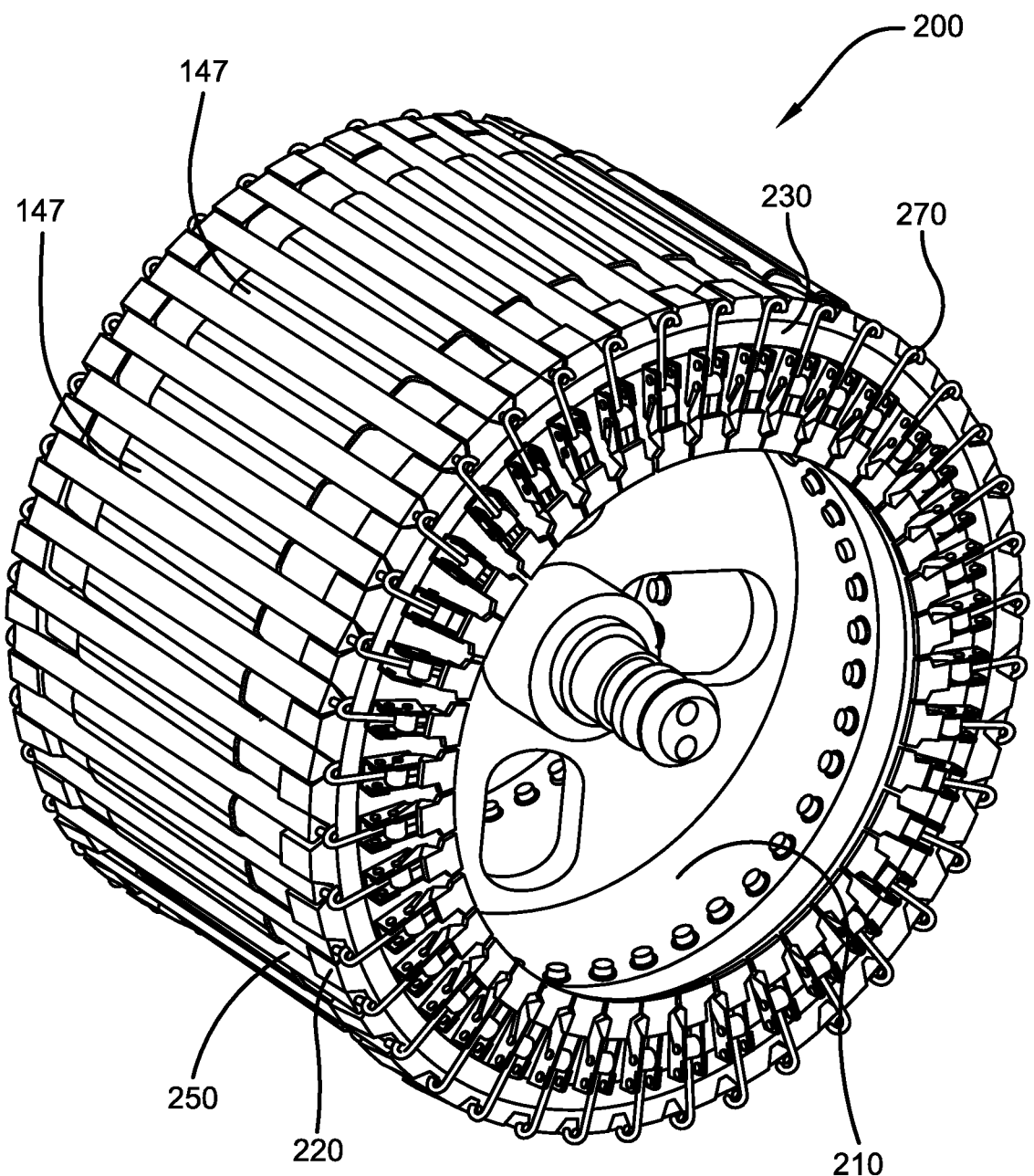
FIG. 13 is a schematic perspective view of still another part of the assembly of FIG. 3.
Figure 14:
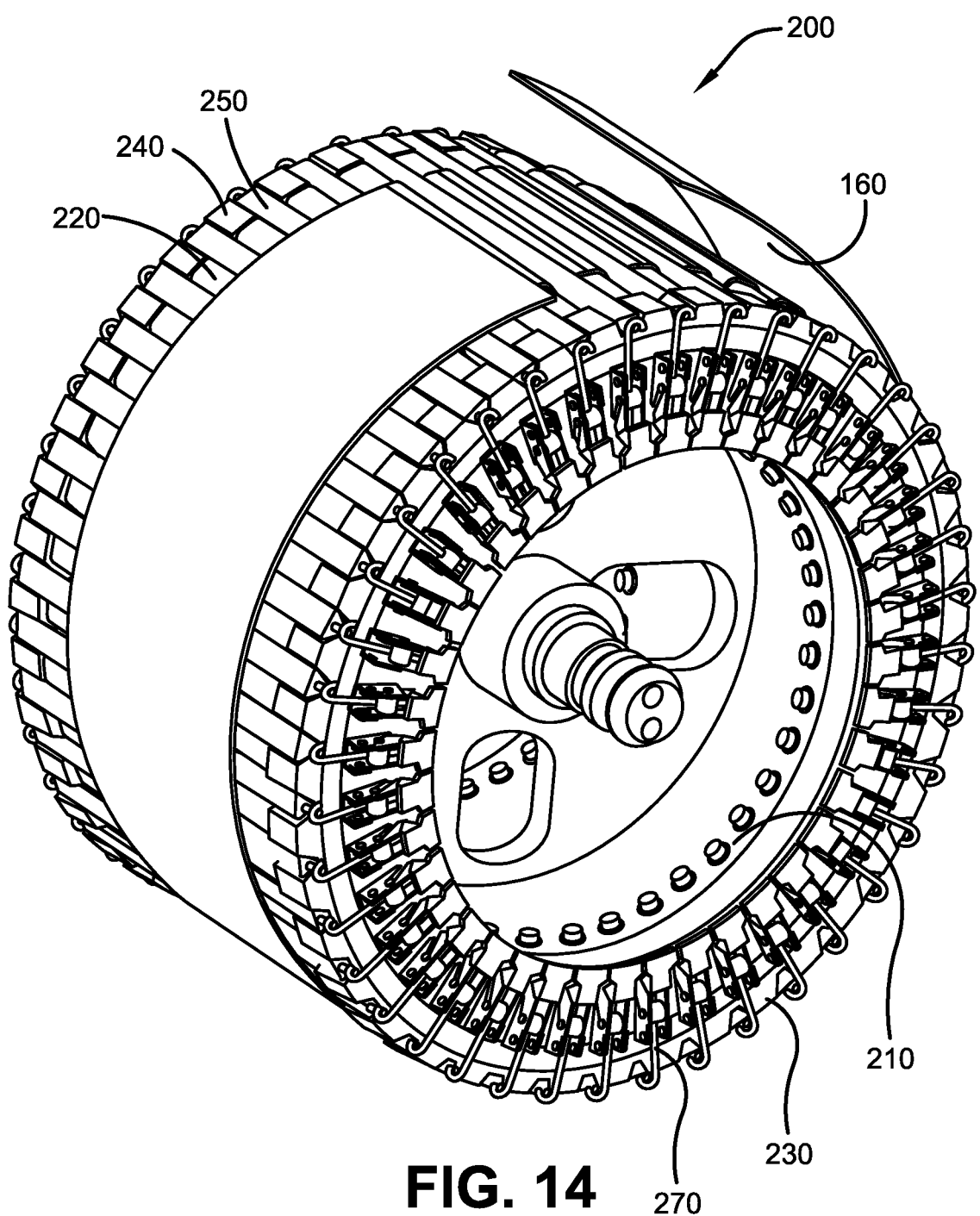
FIG. 14 is a schematic perspective view of yet another part of the assembly of FIG. 3.

In accordance with the present invention, as shown in FIGS. 1-2, the spacer members 220 may include a first longitudinal body member 301 axially opposed to a second longitudinal body member 302, two cam bolts 311 for adjusting the radial gap between the first longitudinal body member 301 and the second longitudinal body member 302, and two helical springs 321 each attached to the first body member 301 and the second body member 302 for maintaining a radial compressive force against the cam bolts 311. Each cam bolt 311 may be mounted within a circumferentially extending groove 305 on an axially inner surface 303 of the second longitudinal body member 302.

The grooves 305 and the cam bolts 311 thereby allow a two-position adjustment of the spacer members 220. When each cam bolt 311 is rotatingly aligned such that its width is positioned wider than each groove 305, the spacer member 220 and springs 321 may expand to a first greater radial height position in order to tension the flap members 147 of the tire assembly 140 (FIG. 1). When each cam bolt 311 is rotatingly aligned such that its width is positioned narrower than each groove 305, the spacer member 220 and springs 321 may contract to a second lesser radial position (FIG. 2). Thus the spacer members 220 may be expanded to the first radial position (FIG. 1) during curing to ensure the proper overlap for the flap members 147 of the tire assembly 140 and uniform dimensions for the cavities 176 (FIG. 21). After curing, the spacer members 220 may be adjusted to the second radial position for facilitating removal from the cavities 176 (FIG. 20).

Figure 22:
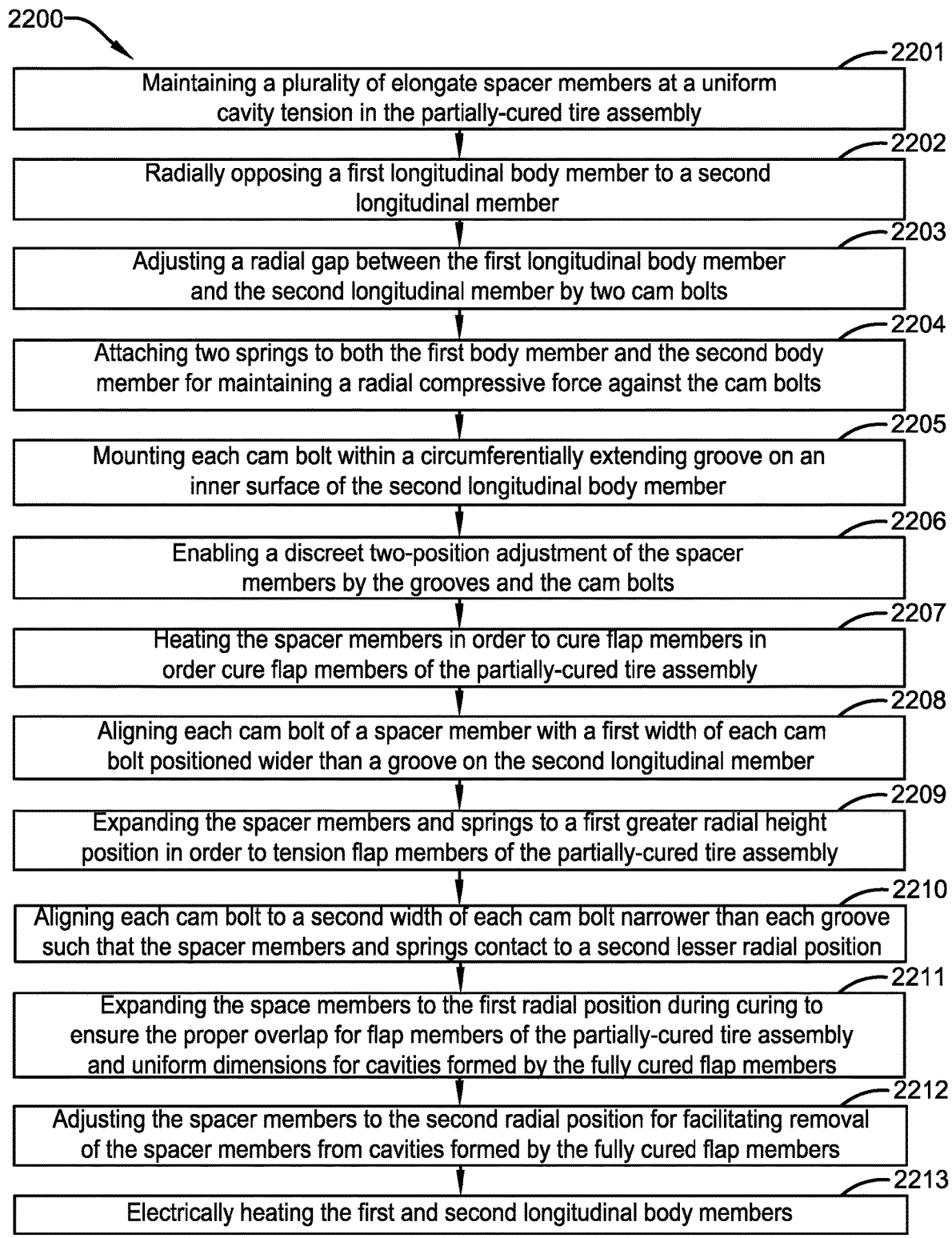
FIG. 22 is a schematic flow chart of an example method in accordance with the present invention.

As shown in the FIG. 22, a method 2200 in accordance with the present invention may complete the curing of a partially cured tire assembly. The method 2200 may include the steps of: a first step 2201 of maintaining a plurality of elongate spacer members at a uniform cavity tension in the partially-cured tire assembly; a second step 2202 of radially opposing a first longitudinal body member to a second longitudinal body member; a third step 2203 of adjusting a radial gap between the first longitudinal body member and the second longitudinal body member by two cam bolts; and a fourth step 2204 of attaching two springs to both the first body member and the second body member for maintaining a radial compressive force against the cam bolts.

The method 2200 may further include a fifth step 2205 of mounting each cam bolt within a circumferentially extending groove on an inner surface of the second longitudinal body member, a sixth step 2206 of enabling a discreet two-position adjustment of the spacer members by the grooves and the cam bolts, a seventh step 2207 of heating the spacer members in order to cure flap members of the partially-cured tire assembly, an eighth step 2208 of aligning each cam bolt of a spacer member with a first width of each cam bolt positioned wider than a groove on the second longitudinal body member, a ninth step 2209 of expanding the spacer members and springs to a first greater radial height position in order to tension flap members of the partially-cured tire assembly, a tenth step 2210 of aligning each cam bolt to a second width of each cam bolt narrower than each groove such that the spacer members and springs contract to a second lesser radial position, an eleventh step 2211 of expanding the spacer members to the first radial position during curing to ensure the proper overlap for flap members of the partially-cured tire assembly and uniform dimensions for cavities formed by cured flap members, a twelfth step 2212 of adjusting the spacer members to the second radial position for facilitating removal of the spacer members from cavities formed by the fully-cured flap members, and a thirteenth step 2213 of electrically heating the first and second longitudinal body members.

Variations in the present invention are possible in light of the description of it provided herein. While certain representative examples and details have been shown for the purpose of illustrating the present invention, it will be apparent to those skilled in this art that various changes and/or modifications may be made therein without departing from the scope of the present invention. It is, therefore, to be understood that changes may be made in the particular examples described herein, which will be within the full scope of the present invention as defined by the following appended claims. Further, the present invention is not limited to the examples hereinbefore described, which may be varied in construction and/or detail within the full scope of the appended claims.

What is claimed:

1. A system for curing and manufacturing a partially-cured tire assembly, the system comprising:
   a plurality of elongate spacer members, each elongate spacer member including a first longitudinal body member radially spaced from a second longitudinal body member, two cam bolts for adjusting a radial gap between the first longitudinal body member and the second longitudinal body member, and two springs each attached to the first longitudinal body member and the second longitudinal body member for maintaining a radial compressive force against the cam bolts; and
   a first annular curing platen and a second annular curing platen for securing the elongate spacer members relative to each other, wherein each cam bolt is mounted within a circumferentially extending groove on a radially outer surface of the second longitudinal body member.

2. The system as set forth in claim 1 wherein the grooves and the cam bolts allow a discrete two-position adjustment of the elongate spacer members.

3. The system as set forth in claim 1 wherein the elongate spacer members and first and second curing platens are heated.

4. The system as set forth in claim 1 wherein each cam bolt of an elongate spacer member is rotatingly aligned, and having a first width of each cam bolt positioned wider than the circumferentially extending groove on the second longitudinal body member, such that the elongate spacer member and springs expand to a first greater radial height position.

5. The system as set forth in claim 4 wherein each cam bolt of an elongate spacer member is rotatingly aligned, having a second width of each cam bolt positioned narrower than the circumferentially extending groove, such that the elongate spacer member and springs contract to a second lesser radial height position.

6. The system as set forth in claim 5 wherein the elongate spacer members are expanded to the first radial height position during curing.

7. The system as set forth in claim 6 wherein, after curing, the elongate spacer members are adjusted to the second radial height position for facilitating removal of the elongate spacer members from the cavities formed in the tire assembly.

8. The system as set forth in claim 1 wherein the elongate spacer members are heated by steam.

9. The system as set forth in claim 1 wherein the first and second longitudinal body members are heated by electricity.

* * * * *